United States Patent
Hubenthal et al.

(12)

(10) Patent No.: US 6,797,186 B2
(45) Date of Patent: Sep. 28, 2004

(54) FLUIDIZED SOLIDS REMOVAL WITH PULSATION

(75) Inventors: Ronald R. Hubenthal, Roscoe, IL (US); Peter G. Baumann, Roscoe, IL (US)

(73) Assignee: Aqua-Arobics Systems, Inc., Loves Park, IL (US)

( * ) Notice: Subject to any disclaimer, the term of this patent is extended or adjusted under 35 U.S.C. 154(b) by 0 days.

(21) Appl. No.: 10/180,693

(22) Filed: Jun. 26, 2002

(65) Prior Publication Data

US 2004/0000526 A1 Jan. 1, 2004

(51) Int. Cl.[7] .......................... B01D 21/24; B01D 21/30
(52) U.S. Cl. ...................... 210/803; 210/138; 210/143; 210/170; 210/523
(58) Field of Search .................. 210/138, 143, 210/513, 523, 525, 532.1, 747, 803, 170

(56) References Cited

U.S. PATENT DOCUMENTS 4,783,272 A * 11/1988 Patterson .................... 210/787

* cited by examiner

Primary Examiner—Robert James Popovics
(74) Attorney, Agent, or Firm—Niro, Scavone, Haller & Niro

(57) ABSTRACT

In a wastewater treatment process involving in-line removal of settled solids through a submerged solids collection manifold, the invention provides devices (and methods?) for resuspending concentrated solids using hydraulic pressure waves to improve removal through the collection manifold. The pressure waves are preferably created by cycling on/off signals to the solids collection pump at a user selected frequency. In some applications resuspension is provided by air scouring. The inventions result in improved solids removal and longer run times for the treatment processes with reduced need for mechanical agitators or scrapers.

6 Claims, 3 Drawing Sheets

FLUIDIZED SOLIDS REMOVAL WITH PULSATION

FIELD OF THE INVENTION

The inventions described below apply generally to the removal of viscous solids that have been concentrated in a region of a liquid medium. More particularly, the inventions relate to methods and apparatus for removing settled solids from wastewater treatment equipment.

BACKGROUND OF THE INVENTION

Typical municipal and industrial wastewater streams contain solid particles in a range of sizes and densities. During conventional treatment processes, solids of larger sizes and densities are removed from the waste stream rather easily. Often, as a primary treatment step, the wastewater is detained in a basin where the heavier particles (those having a density greater than the fluid medium carrying them) settle out of the waste stream through the effects of gravity. Smaller and/or lighter solids, however, remain suspended in the waste stream requiring additional physical and/or chemical processing for removal. Secondary treatment processes designed to remove additional settleable solids commonly include chemical addition of long chain polymer compounds, followed by coagulation, flocculation and solids separation steps.

In both primary and secondary treatment phases, the settled solids are collected (typically at the bottom of the treatment basin) into sloped channels where they naturally thicken near a solids collection manifold. The collection manifold is commonly a perforated channel or conduit in fluid communication with a pump or other means of creating a hydraulic gradient differential between the manifold and the collected solids. In this configuration, solids can be removed from the treatment chamber without disrupting the treatment process. Non-invasive solids removal processes such as this are desirable because they reduce or eliminate the need for physical and mechanical solids removal equipment which results in lower installation and maintenance costs for the treatment unit. In addition, physical and mechanical solids removal procedures require the treatment basin to be periodically taken out of service and/or reduce the amount of wastewater that can be treated in a given period of time.

In order for in-line solids removal processes to function effectively, the solids must be in a fluidized state so as to be drawn into the collection manifold. It is a known problem that accumulated solids, particularly those that include chemical coagulants, thicken above the collection manifold and resist resuspension without physical or mechanical assistance. With a collection manifold that is covered with viscous solids, the pressure differential may only create local pockets of solids fluidization above the collection ports. This condition creates a "rathole" effect that results in reduced solids removal rates and creates a solids build-up that resists non-invasive removal. In addition, the removed solids stream has a solids concentration that is undesirably low thereby requiring greater thickening and disposal costs.

It is therefore a problem with some conventional in-line solids removal systems that settled solids cannot be adequately resuspended to be withdrawn through a collection manifold without the aid of mechanical scrapers, agitators or similar physical aids. It is a further problem that the fluidized solids that are removed in such systems have low solids concentration rates that result in higher costs for solids handling and removal.

The following inventions describe enhancements to an in-line solids removal process that improve solids resuspension without the application of physical scrapers or mechanical agitators. The inventions describe various means to create transient pressure waves in the collection manifold. The transient pressure waves operate in a manner similar to the water hammer effect known in the art. Under the water hammer effect, a fluid stream in motion in a closed conduit has a momentum head. When the conduit closes (as with the operation of an in-line valve) the momentum head reflects off the closure and creates a pressure surge that travels back through the conduit. The pressure surge returns to the closure and back through the conduit repeatedly until the pressure surge is dampened. In the proper frequency range, the pressure waves improve resuspension of solids and reduce "rathole" effects. Therefore it is a feature and an advantage of the inventions that settled solids can be resuspended for removal without the use of mechanical scrapers or agitators.

It is also a feature and an advantage of the inventions that chemically conditioned solids that cannot be removed by conventional in-line systems can be removed by the pulsating flow regime without the aid of mechanical scraping or agitating. It is also an advantage that similar results may be obtained through air scouring of the collection manifold, either alone or in combination with a transient pressure wave.

DEFINITION OF TERMS

The following terms are used in the claims of the patent and are intended to have their broadest meaning consistent with the requirements of law:

wastewater: any municipal, commercial or industrial process water not intended for human ingestion.

Where alternative meanings are possible, the broadest meaning is intended. All words in the claims are intended to be used in the normal, customary usage of grammar and the English language.

DETAILED DESCRIPTION OF THE PREFERRED EMBODIMENT

Set forth below is a description of what is currently believed to be the preferred embodiment or best example of the invention claimed. Future and present alternatives and modifications to this preferred embodiment are contemplated. Any alternatives or modifications which make insubstantial changes in function, in purpose, in structure or in result are intended to be covered by the claims of this patent.

Figure 1:
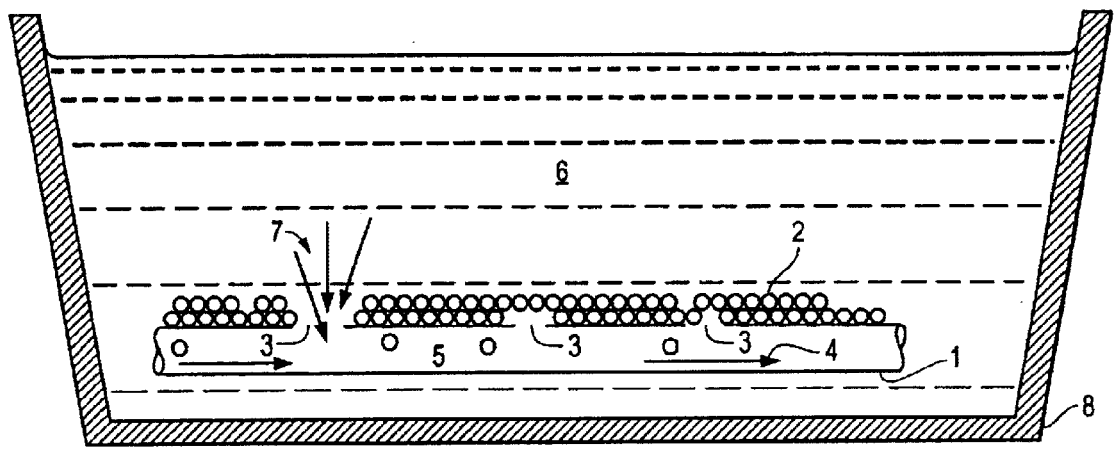
FIG. 1 is a profile view of settled solids in communication with a collection manifold as such systems are known in the art of the invention in a stabilized flow condition.

FIG. 1 depicts a solids collection manifold 1 bearing an accumulation of settled solids 2. A plurality of collection ports 3 in communication with the settled solids 2 are spaced along the manifold 1. The configuration shown in FIG. 1 operates in a submerged condition within a treatment basin 8. As is known in the art, the manifold 1 may be connected to a pump 9 at an upstream or downstream location to create a flow path 4 in the manifold 1. Typically a fixed speed, constant head pump profile is applied to generate flow through the manifold 1. As the system is known in the art, the pump 9 creates a stabilized flow path 4 that results in the occurrence of localized pressure differentials at the collection ports 3. When the pressure is lower on the interior of the manifold 1 than on the exterior, the collection ports 3 draw solids 2 into the manifold 1 from the surrounding external area.

In some circumstances, solids 2 that accumulate near the manifold 1 are known to agglomerate and become a concentrated blanket. The solids blanket requires resuspension to fluidize the solids 2 so that they may be withdrawn through the collection ports 3. When the solids blanket is not thoroughly resuspended by the pressure differential, only solids 2 in the near vicinity of the collection ports 3 are drawn into the manifold 1. Once these solids 2 have been entrained in the solids stream 5, a void space is created at the collection port 3. Since solids 2 that have not been resuspended are not drawn into the manifold 1, the collection ports 3 draw the surrounding wastewater 6 into the manifold 1 creating a solids stream 5 of low concentration. The effect is referred to as a "rathole" 7 effect that represents an undesirable flow condition at the manifold 1. In this condition, additional solids 2 from the solids blanket are not removed without aid from a mechanical agitator or scraper.

Figure 2:
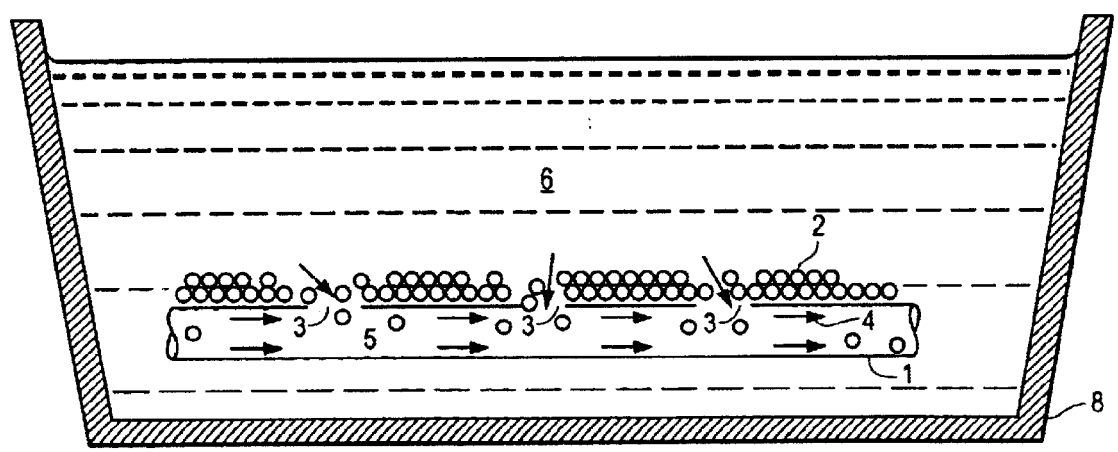
FIG. 2 is a profile view of settled solids in communication with a collection manifold under the influence of a pulsating flow condition.

In a preferred embodiment of the invention, a collection manifold 1 is connected to a pump 9 and the manifold 1 is placed in a sloped trough 10 that facilitates the concentration of solids 2 around the manifold 1. The collection manifold 1 is commonly a PVC pipe that has holes spaced along the length of the manifold 1. The operating conditions at the pump 9 are modified to create periodic transient pressure waves in the collection manifold 1. This results in a pulsating flow condition at the collection ports 3. FIG. 2 shows a collection manifold 1 operating under a pulsating flow condition. Repeated transient pressure waves formed by the pulsating flow create alternating positive and negative pressure differentials at the collection ports 3 inducing a similar effect as mechanical vibration. The pulsating flow condition fluidizes a greater portion of the solids blanket and draws more solids 2 into the collection manifold 1.

In the preferred embodiment, the pulse is created by repeated start and stop signals sent to the pump 9. The pump 9 is preferably an air lift pump with programmable controls and on/off timers monitored by a control system. On/off cycles in the preferred embodiment are set at 5 second intervals repeated for 30 to 60 seconds. While 5 second intervals are preferred, it is known that the invention remains generally effective in a range of cycles from approximately 2 second intervals to approximately 10 second intervals. The lower interval limit is presently fixed based on the known limits in existing control technology on air lift pump applications. Shorter intervals may also be effective if attainable through later developed technology. Throughout the range of cycle intervals, the preferred cycling period is approximately 30 to 60 seconds. To maintain the desired effect, cycling periods are repeated in proportion to the solids generation rate at the manifold 1. High solids generation rates may dictate additional cycling as soon as 30 minutes after the prior cycling, although it is preferred that repeat cycling is minimized to reduce the amount of waste produced during the process.

Figure 3:
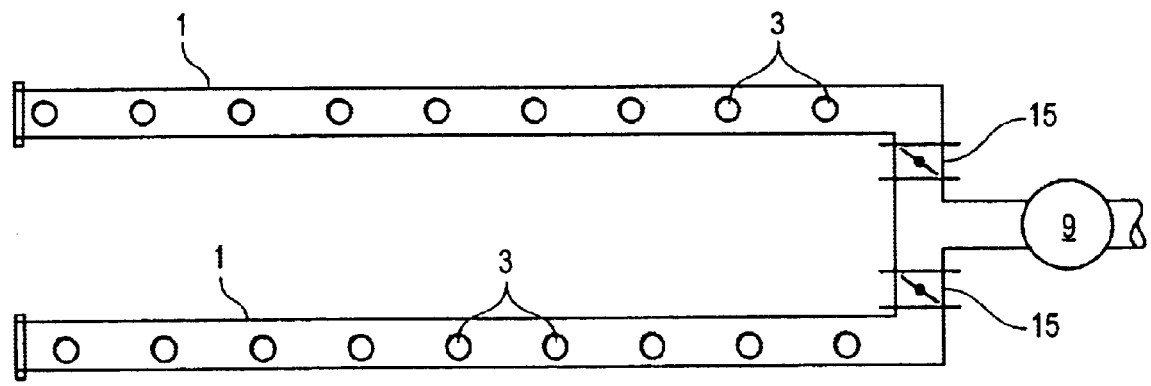
FIG. 3 is a two dimensional view of a typical collection manifold.

It is recognized that the same or similar effect may be achieved with other pumps 9 used in the wastewater industry including piston, centrifugal or progressing cavity pumps. Similarly, the transient wave condition may be created by the operation of a fast acting valve actuator, on a solenoid valve 15, butterfly valve 15 or pinch valve 15 in lieu of cycling on/off signals. The various pump 9 or valve 15 control methods may be used alone or in combination to achieve the objectives of the invention. For a more even solids withdrawal rate, the on/off control cycles of two collection manifolds 1 can be synchronized so that when one manifold 1 closes another manifold 1 reopens. FIG. 3 illustrates a manifold 1 configuration where this result can be attained by sending an "off" (or "close") control signal to one valve 15 while sending an "on" (or "open") control signal to another valve 15 at approximately the same time.

Figure 4:
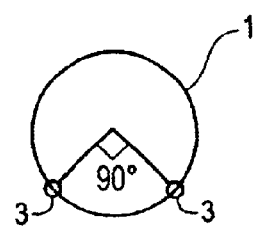
FIG. 4 is a cross-sectional view of a perforation pattern for a collection manifold.
Figure 5:
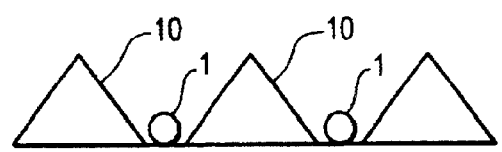
FIG. 5 is a cross-sectional view of a collection trough and collection manifold system.

FIG. 3 shows two collection manifolds 1 linked to a pump 9. The longitudinal spacing of the ports 3 on the collection manifold 1 is a function of the capacity of the pump 9 and the viscosity of the solids 2. A shorter port 3 spacing is required when the solids 2 are more viscous. Broader port 3 spacing may be employed where solids 2 are more fluid. In the preferred embodiment, opposing ports 3 lie in a cross section of the manifold 1 at a 90 degree spacing (see FIG. 4). Conventionally, each manifold 1 is located in a solids collection trough 10 (FIG. 5). In the preferred embodiment the troughs 10 have a trapezoidal cross section. Other geometric configurations are also contemplated by the invention.

Figure 6:
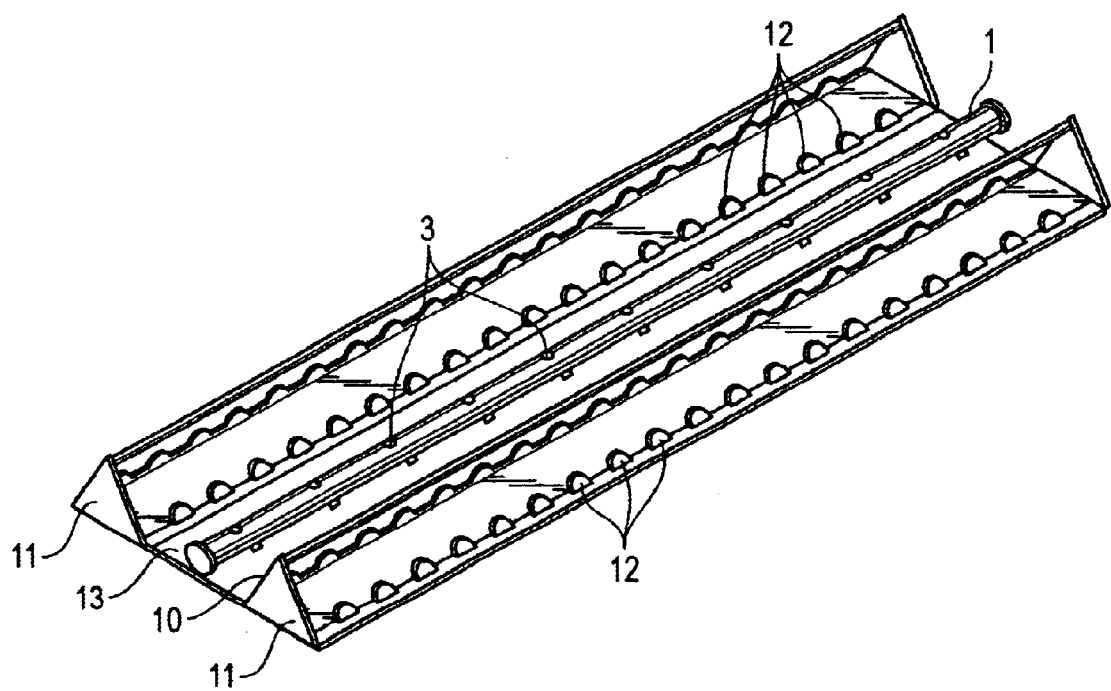
FIG. 6 is a three dimensional view of a collection trough with diffusers for air scouring.

In an alternative to the preferred embodiment, the collection troughs may 10 also be fabricated to act as air distribution headers for an air scouring system. Solids settling in collection troughs 10 around a manifold 1 are often consolidated by the action of additional solids deposited in the trough 10. Air scouring facilitates the resuspension of consolidated solids around the manifold 1. FIG. 6 shows a trapezoidal collection trough 10 formed by two triangular channels 11 positioned on a mounting surface 13 (such as a bottom surface of a basin 8) on opposite sides of a manifold 1. In a preferred embodiment, each of the triangular channels 11 have a plurality of coarse diffusers 12 located on the channel walls adjacent to the manifold 1. An air supply, commonly provided by a compressor or blower as is known in the art (not shown), is introduced to the interior of the triangular channels 11. The diffusers 12 are perforations that allow the air introduced into the channels 11 to escape in the form of small air bubbles. The action of the air bubbles near the manifold 1, resuspends the consolidated solids creating a more fluidized solids blanket that is more easily withdrawn through the manifold 1.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

What is claimed is:

1. In a basin that facilitates the removal of solids from wastewater, said basin having a solids collection manifold, a method for withdrawing solids from said basin through said manifold comprising the steps of:

connecting a pump to the collection manifold, said pump having a mechanism to start and stop flow that receives electronic signals;

sending alternating signals to said pump mechanism causing said pump to turn on and off; and controlling the rate of on/off cycling at said pump so that the interval between said alternating signals is less than ten seconds.

2. The method of claim 1 further comprising:

creating a series of pressure waves in said manifold, said pressure waves fluidizing said solids accumulated near the exterior of said manifold.

3. In a basin that facilitates the removal of solids from wastewater, said basin having a solids collection manifold, a process for withdrawing settled solids from said basin through said manifold comprising the steps of:

connecting a pump to the collection manifold;

connecting a valve to the collection manifold, said valve having an actuator that receives electronic signals;

sending alternating signals to said actuator causing said valve to open and close; and controlling the rate of open/close cycling at said valve so that the interval between said alternating signals is less than five seconds.

4. The method of claim 3 further comprising:

creating a series of pressure waves in said manifold, said pressure waves fluidizing said solids accumulated near the exterior of said manifold.

5. In a basin that facilitates the removal of solids from wastewater, an apparatus for withdrawing solids from said basin comprising:

a collection manifold;

a pump in fluid communication with said manifold, said pump having a mechanism to start and stop flow that receives electronic signals; and an electronic controller that sends on/off signals to said pump at intervals of less than ten seconds.

6. In a basin that facilitates the removal of solids from wastewater, an apparatus for withdrawing solids from said basin comprising:

a collection manifold;

a pump in fluid communication with said manifold;

a valve in fluid communication with said manifold and said pump, said valve having an actuator that receives electronic signals; and an electronic controller that sends open/close signals to said actuator at intervals of less than ten seconds.

* * * * *